(12) United States Patent
Teng et al.

(10) Patent No.: US 6,711,008 B2
(45) Date of Patent: Mar. 23, 2004

(54) COMPUTER PANEL

(75) Inventors: Ming Fu Teng, Shulin (TW); Chin Yi Chen, Shulin (TW)

(73) Assignee: Shin Cheng Industrial Co., Ltd., Taipei (TW)

(*) Notice: Subject to any disclaimer, the term of this patent is extended or adjusted under 35 U.S.C. 154(b) by 0 days.

(21) Appl. No.: 10/157,914

(22) Filed: May 31, 2002

(65) Prior Publication Data

US 2003/0095384 A1 May 22, 2003

(30) Foreign Application Priority Data

Nov. 22, 2001 (CN) .......................................... 01258124

(51) Int. Cl.[7] ................................................ G06F 1/16
(52) U.S. Cl. ........................ 361/683; 361/725; 361/727; 312/223.1; 312/223.2
(58) Field of Search ................................ 361/693–696, 361/724–727; 312/223.1, 223.2; 369/75.1, 80–82

(56) References Cited

U.S. PATENT DOCUMENTS

| | | | | |
|---|---|---|---|---|
| 5,169,218 A | * | 12/1992 | Chu ........................ 312/223.2 |
| 5,924,780 A | * | 7/1999 | Ammon et al. .......... 312/223.2 |
| 6,132,019 A | * | 10/2000 | Kim et al. ................ 312/223.2 |
| 6,219,226 B1 | * | 4/2001 | Bullington et al. ......... 361/683 |
| 6,398,327 B1 | * | 6/2002 | Momoze ................... 312/319.1 |

* cited by examiner

*Primary Examiner*—Darren Schuberg
*Assistant Examiner*—Anthony Q. Edwards
(74) *Attorney, Agent, or Firm*—Troxell Law Office PLLC

(57) ABSTRACT

A computer panel having a pullable door installed to an inner frame of the computer panel is disclosed. The pullable door is formed by a plurality of cover plates. Two corners of each cover plate have respective first grooves and hooks which are coupled to the cover plates. Two sides of the inner frame of the computer panel have guide plates. An elastic slot is installed at a lower end of the guide plate. Two outer sides of the inner frame of the computer panel are installed with shield plates and are formed with a guide groove with the guide plate. By above mentioned structure, the two lateral sides of the pullable door can slide along the guide grooves at two sides of the inner frame of the computer panel. Thereby, it is unnecessary to detach a panel and the cover plate, the computer panel can be installed rapidly.

5 Claims, 5 Drawing Sheets

COMPUTER PANEL

FIELD OF THE INVENTION

The present invention relates to computer panels, and particularly to a computer panel. The user is unnecessary to detach a panel and the cover plate, while the computer panel can be installed rapidly.

BACKGROUND OF THE INVENTION

Since more and more applications about computers are developed and used, computer panels are frequently detached for installing other peripheral devices, such as VCD optical drives, or DVD drives, etc., as shown in FIG. 1. In general, the computer mainframe 1 has a casing 11 and a panel 12. If a device without any circuit board is to be installed, the casing 11 is opened and then the device is fixed to the rack and is connected to the power source and bus. If it is desired to install a device having a circuit board, such as a VCD optical driver 122 or an extractable hard disk drive, the panel 12 is possibly removed. Since the panel 12 has an inner frame. The inner frame is filled by a plurality of cover plates 121 for preventing dusts to flow into the frame. Thus, if it is necessary to cause the operation panel of the device to protrude to the panel 12, a cover plate 121 corresponding to the device must be detached. Therefore, the operation is complicated. Thereby, the detached cover plate 121 is possible to be lost, while when it is desired to use the cover plate 21, the user can not find it.

SUMMARY OF THE INVENTION

Accordingly, the primary object of the present invention is to provide a computer panel, in that a device can be installed without needing to detach or install a cover plate.

To achieve above objects, the present invention provides a computer panel having a pullable door installed to an inner frame of the computer panel. The pullable door is formed by a plurality of cover plates. Two corners of each cover plate have respective first grooves and hooks which are coupled to the cover plates. The computer panel has an inner frame. The two sides of the inner frame have guides plates; an elastic slot is installed at a lower end of the guide plate. Two outer sides of the inner frame of the computer panel are installed with shield plates and are formed with a guide groove with the guide plate. By above mentioned structure, the two lateral sides of the pullable door can slide along the guide grooves at two sides of the inner frame of the computer panel. Thereby, the pullable door can cover the inner frame of the computer panel, so that the whole pullable door will move downwards and a space for adjustment will expose out, thus it is unnecessary to detach a panel and the cover plate, the computer panel can be installed rapidly.

The various objects and advantages of the present invention will be more readily understood from the following detailed description when read in conjunction with the appended drawing.

DETAILED DESCRIPTION OF THE PREFERRED EMBODIMENTS

Figure 1:
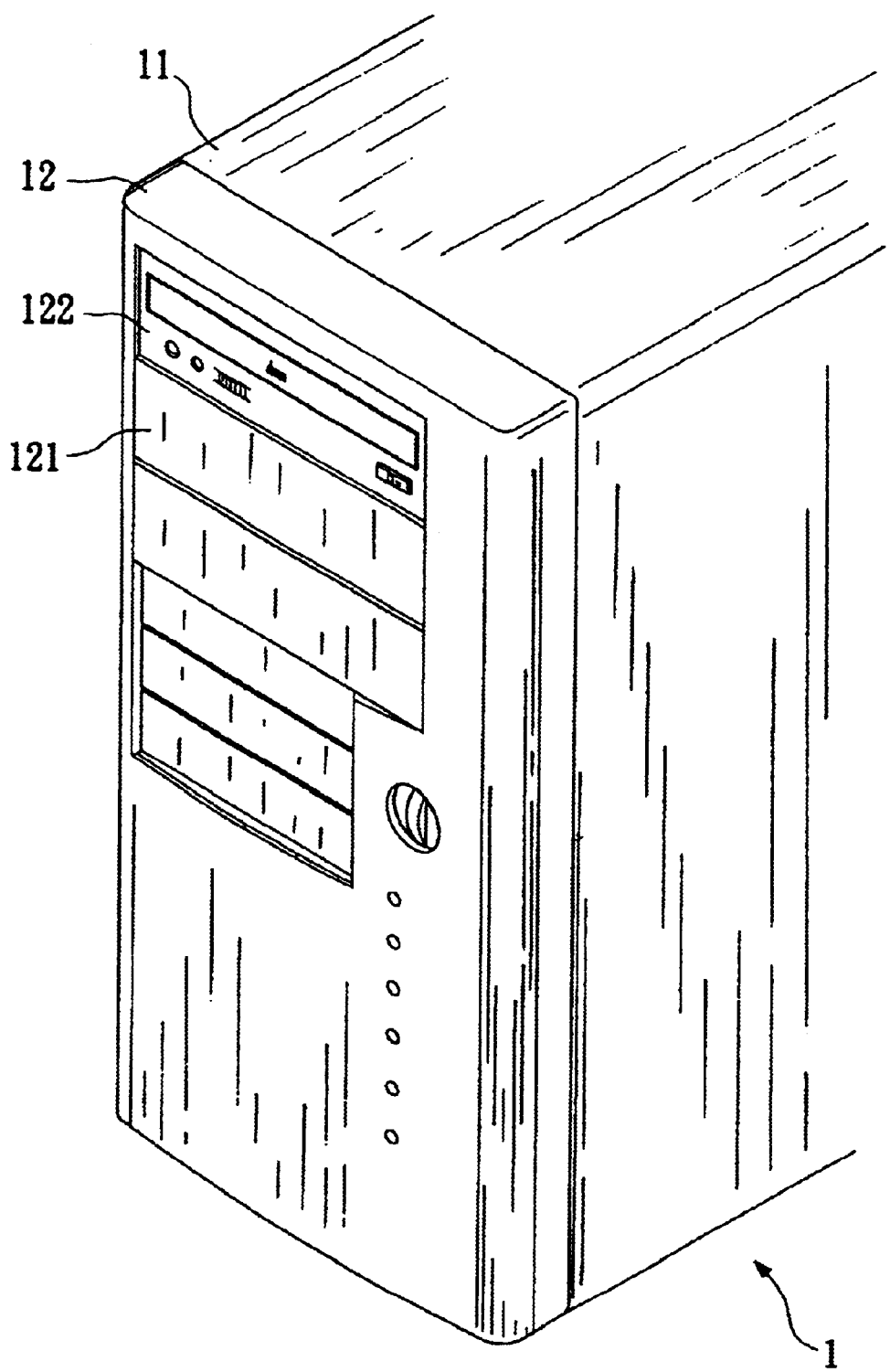
FIG. 1 is a perspective view of a computer panel of the conventional computer panel.
Figure 2:
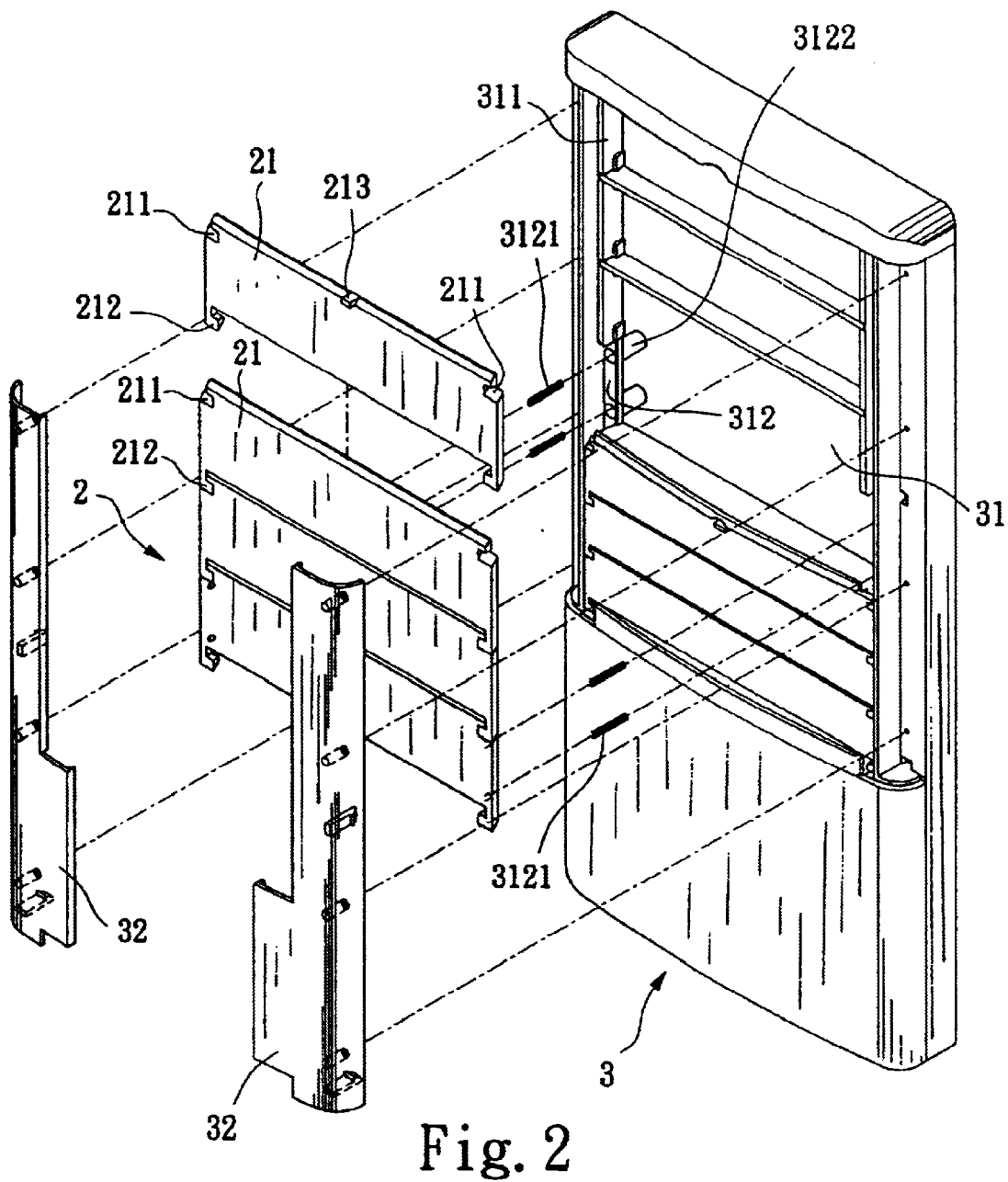
FIG. 2 is an exploded perspective view of the present invention.

Referring to FIGS. 2, the exploded perspective view of the present invention is illustrated. As shown in the figure, in the computer panel 3 of the present invention, a pullable door 2 is installed to an inner frame 31 of the computer panel 3.

The pullable door 2 is formed by a plurality of cover plates 21. Two corners at topside of each cover plate 21 have respective L shape groove 211. The two corners at the lower side thereof are protruded L shape hook 212 which can be used to fill the groove 211. The horizontal surface of each groove 211 and the horizontal bottom of the hook 212 has guide surfaces which are inclined forwards. When the upper and lower lateral sides of each cover plate 21 are connected by coupling the groove 211 with the hook 212, a plane pullable door 2 is formed. The cover plate 21 at the uppermost layer of the pullable door 2 has a block 213 protruded forwards from the top side thereof. The block 213 may be pressed downwards or pulled upwards by a hand.

The computer panel 3 has an inner frame 31. The two sides of the inner frame 31 have guides plates 311. An elastic slot 312 is installed at a lower end of the guide plate 311. A bottom of the elastic slot 312 has two cylindrical grooves 3122 for being inserted by springs 3121. Moreover, the two outer sides of the inner frame 31 of the computer panel 3 are installed with shield plates 32 and are formed with a guide groove with the guide plate 311.

Figure 3:
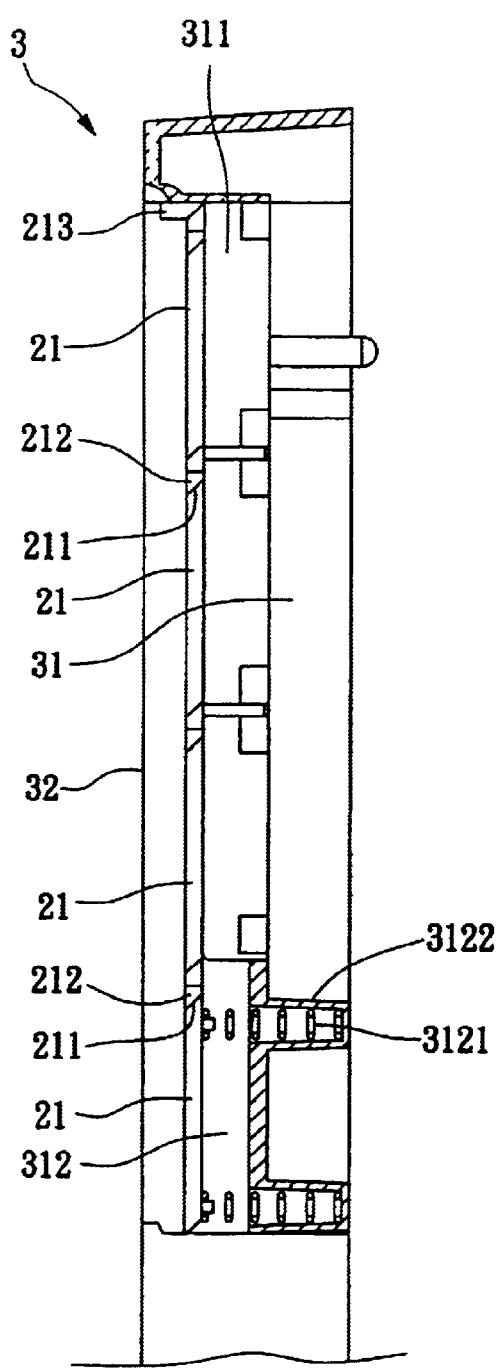
FIG. 3 is an assembled cross sectional view of the present invention.
Figure 5:
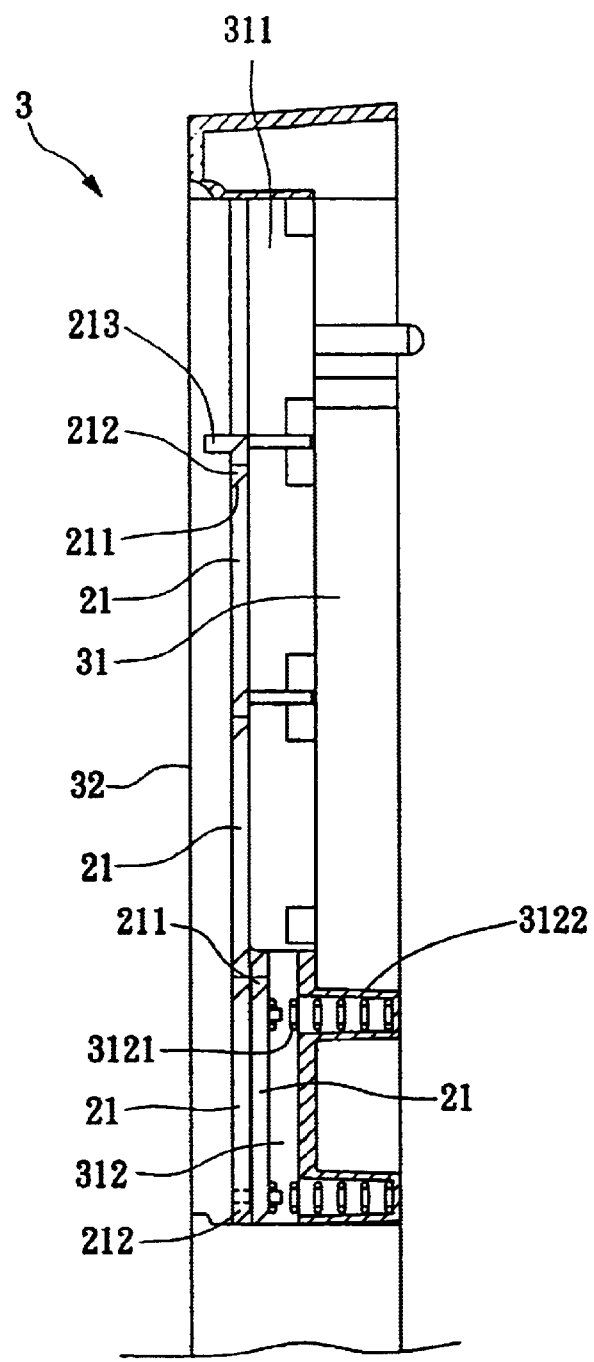
FIG. 5 shows one application of the present invention.
Figure 4:
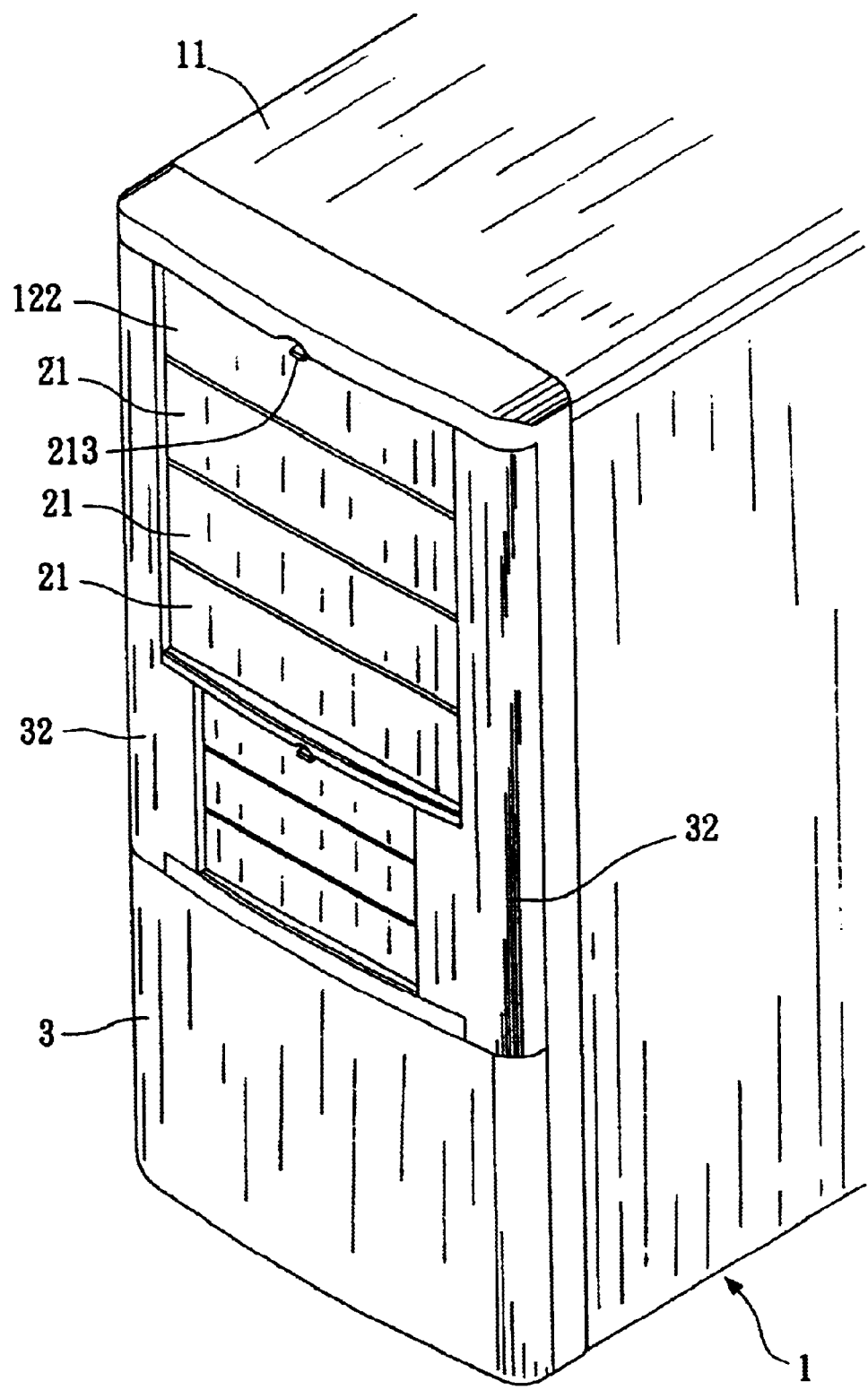
FIG. 4 is an assembled perspective view of the present invention.
Figure 6:
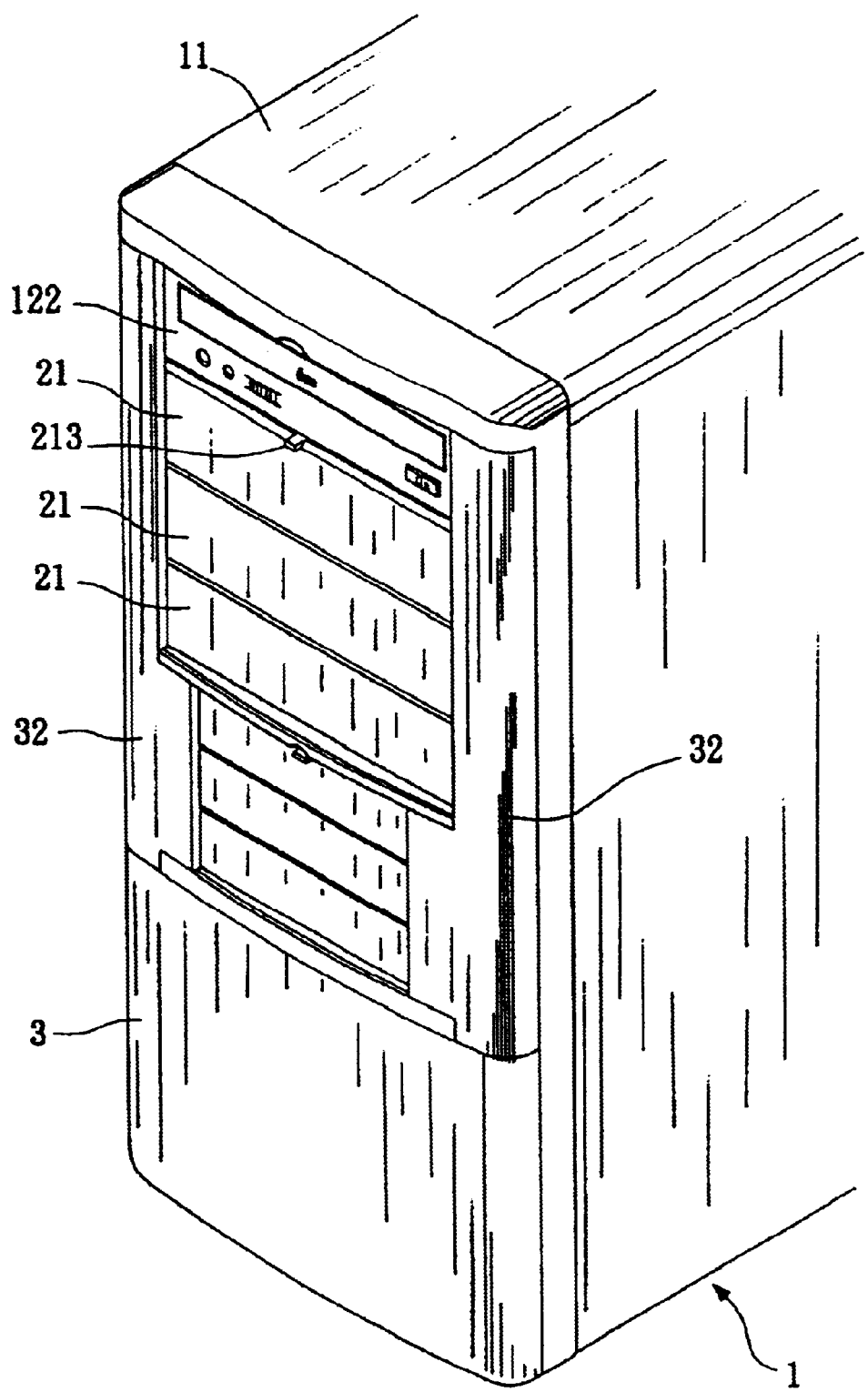
FIG. 6 shows one preferred embodiment of the present invention.

By above mentioned structure, the two lateral sides of the pullable door 2 may slide along the guide grooves at two sides of the inner frame 31 of the computer panel 3. When the pullable door 2 dose not be pulled downwards, the cover plate 21 at the lowest layer of the pullable door 2 is pushed to the spring 3121 in the elastic slot 312 and thus does not reduce into the elastic slot 312. Thereby, the pullable door 2 can cover the inner frame 31 of the computer panel 3 (referring to FIGS. 3 and 4). When a device with an operating panel is installed, such as VCD optical driver 122, it is only necessary to detach the casing 11. Then the block 213 at the top of the pullable door 2 is pressed by fingers so that the cover plate 21 at the lowest layer is pressed by the upper cover plate 21. By the groove 211 and the hook 212 between two cover plates 21, the cover plate 21 at the lower layer will be pressed by the cover plate 21 at the upper layer. Moreover, the inclined surface between the groove 211 and the hook 212, the cover plate 21 at the lowest layer is pressed by the cover plate 21 at the upper layer so that the cover plate 21 at the lower layer will retract into the elastic slot 312. Thereby, two cover plates 21 are positioned at the elastic slot 312. Moreover, the height of the pullable door 2 will be descended. Meanwhile, the computer panel 3 will have a space for being inserted by the VCD optical driver 122. After the VCD optical driver 122 is inserted into the space, the VCD optical driver 122 can be directly fixed to the frame in the mainframe and is connected to the power source and bus. Thereby, the assembling work is completed (referring to FIGS. 5 and 6). Not only to be used for preventing dusts, but also it is unnecessary to detach or install the pullable door 2 and the cover plates 21. Thereby, the work is reduced and it is not necessary to worry about the arrangement of the cover plates 21.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer panel having a pullable door installed in an inner frame of the computer panel comprising:

the pullable door is formed by a plurality of cover plates; two corners of each cover plate have respective first grooves and hooks which are coupled to the cover plates;

the computer panel has an inner frame; the two sides of the inner frame have guide plates; an elastic slot is located at a lower end of the guide plate; two outer sides of the inner frame of the computer panel have shield plates;

whereby, by above mentioned structure, two lateral sides of the pullable door slide along the guide grooves at two sides of the inner frame of the computer panel; thereby, the pullable door covers the inner frame of the computer panel, so that the whole pullable door will move downwards and a space for adjustment will be exposed, thus it is unnecessary to detach a panel and the cover plate, the computer panel can be installed rapidly.

2. The computer panel as claimed in claim 1, wherein a bottom of the elastic slot has a first cylindrical groove for installing an elastic body.

3. The computer panel as claimed in claim 2, wherein the elastic body is a spring.

4. The computer panel 3 as claimed in claim 1, wherein two corners at top sides of each cover plate have respective L shape groove; two corners at the lower side thereof have protruding L shape hook for engaging the groove; a horizontal surface of each groove and a horizontal bottom of the hook have guide surfaces which are inclined forwards.

5. The computer panel as claimed in claim 1, wherein the cover plate at an uppermost layer of the pullable door has a block protruding forwards from a top side thereof such that the block can be pressed downwards or pulled upwards by a hand.

* * * * *